United States Patent [19]

Wilson et al.

[11] Patent Number: 5,757,725
[45] Date of Patent: May 26, 1998

[54] DUAL ZERO VELOCITY TOWED ARRAY SYSTEM

[75] Inventors: Douglas H. Wilson, Mystic; Robert Hauptmann, Groton, both of Conn.

[73] Assignee: The United States of America as represented by the Secretary of the Navy, Washington, D.C.

[21] Appl. No.: 914,022

[22] Filed: Aug. 12, 1997

[51] Int. Cl.[6] ................................... G01S 3/80
[52] U.S. Cl. ................................... 367/130
[58] Field of Search ................... 367/130, 106, 367/20, 16; 114/242

[56] References Cited

U.S. PATENT DOCUMENTS

| | | | |
|---|---|---|---|
| 3,978,813 | 9/1976 | Pickens et al. | 367/20 |
| 4,004,265 | 1/1977 | Woodruff et al. | 367/130 |
| 4,999,816 | 3/1991 | Dale et al. | 367/4 |

*Primary Examiner*—Daniel T. Pihulic
*Attorney, Agent, or Firm*—Michael J. McGowan; Prithvi C. Lall; Michael F. Oglo

[57] ABSTRACT

A dual zero velocity towed array system for use in an ocean environment comprises a plurality of towed array subsystems and a deployment vessel. Each towed array subsystems comprises a rear drogue, an elongated communication cable having mounted thereon at least one acoustic sensor. The deployment vessel deploying the towed array subsystems. The deployment vessel moving in a forward direction through the ocean environment at a selected forward motion rate and alternatingly deploys the at least one acoustic sensor and communication cable of alternate ones of the towed array subsystems during successive iterations. In each iteration the deployment vessel deploys one of the towed array subsystems rearwardly at a deployment rate corresponding to the forward motion rate, thereby to maintain the at least one acoustic sensor and communication cable in a stable position in the ocean environment. While it deploys one of the towed array subsystems during each iteration, the deployment vessel retracts the other of the towed array subsystems for deployment in the next iteration.

7 Claims, 1 Drawing Sheet

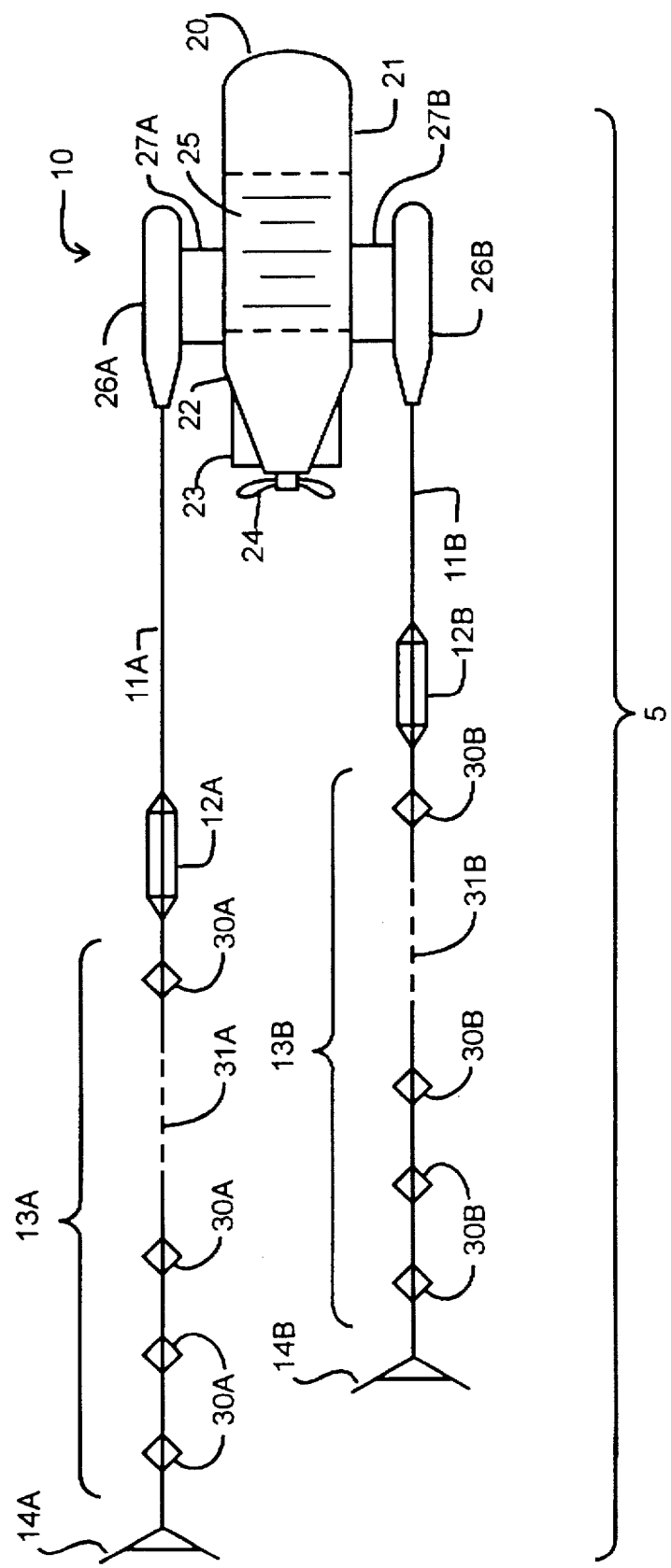

1

DUAL ZERO VELOCITY TOWED ARRAY SYSTEM

STATEMENT OF GOVERNMENT INTEREST

The invention described herein may be manufactured by or for the Government of the United States of America for Governmental purposes without the payment of any royalties thereon or therefor.

CROSS REFERENCES TO RELATED PATENT APPLICATIONS

The instant application is related to a co-pending U.S. patent applications entitled ZERO VELOCITY TOWED ARRAY SYSTEM (Navy Case No. 75935) U.S. patent application Ser. No. 08/914,021 having same filing date of Aug. 12, 1997.

BACKGROUND OF THE INVENTION

(1) Field of the Invention

The invention relates generally to the field of sensors for sensing acoustic signals in an ocean environment, and more particularly to towed acoustic sensor array systems.

(2) Description of the Prior Art

In, for example, seismic imaging and other similar operations in an ocean environment, sonar devices are generally towed in an array behind towing vessels or "platforms," such as ships, over an area to be imaged. The array may comprise a one-dimensional array, in which the sonar devices are attached to a single cable and allowed to stream behind the towing platform. Alternatively, the array may comprise a two-dimensional array, in which a plurality of cables are provided, all of which are to be towed behind the towing platform, and which are to be separated horizontally by selected distances.

Previous towed arrays were attached to the towing vessel by a fixed length cable, and are pulled through the water at the same rate as the towing vessel is moving. The arrays are generally constructed to minimize the amount of noise that is generated while they are being towed, including use of an outer hose, an interior stand-off layer, a distributed hydrophone as an acoustic sensor, and a fluid or solid fill material that fills the space between the hydrophone and the outer hose. These elements tend to result in an enlarged diameter for the hose, which, in turn, requires larger volumes on the towing vessel for storage prior to deployment or after retrieval. In a typical array, the outer hose is generally on the order of several inches in diameter, and a hundred feet long, whereas towing cables can be less than an inch in diameter and thousands of feet long. The storage volume required for both the towing cable and the array includes both the volume required for the towing cable as well as the volume that is required for the array.

SUMMARY OF THE INVENTION

It is therefore an object of the invention to provide a new and improved towed array system which moves at zero velocity, thereby reducing the amount of noise generated during towing and minimizing the diameter of the array.

In brief summary, the dual zero velocity towed array system for use in an ocean environment comprises a plurality of towed array subsystems and a deployment vessel. Each towed array subsystems comprises a rear drogue, an elongated communication cable having mounted thereon at least one acoustic sensor. The deployment vessel deploying the towed array subsystems. The deployment vessel moving in a forward direction through the ocean environment at a selected forward motion rate and alternatingly deploys at least one acoustic sensor and communication cable of alternate towed array subsystems during successive iterations. In each iteration the deployment vessel deploys one of the towed array subsystems rearwardly at a deployment rate corresponding to the forward motion rate, thereby to maintain at least one acoustic sensor and communication cable in a stable position in the ocean environment. While it deploys one of the towed array subsystems during each iteration, the deployment vessel retracts the other of the towed array subsystems for deployment in the next iteration.

BRIEF DESCRIPTION OF THE DRAWINGS

This invention is pointed out with particularity in the appended claims. The above and further advantages of this invention may be better understood by referring to the following description taken in conjunction with the accompanying drawing, which schematically depicts a dual zero velocity towed array system constructed in accordance with the invention.

DESCRIPTION OF THE PREFERRED EMBODIMENT

With reference to the drawing, a dual zero velocity towed array system 5 constructed in accordance with the invention is depicted. The towed array system 5 includes a forward deployment vessel 10, and plural communications cables 11A, 11B, telemetry subsystems 12A, 12B, towed arrays 13A, 13B, and rear drogue 14A, 14B, all of which will be used in an ocean environment. During an acoustic information gathering session, during which one or the other of the towed arrays 13A and 13B will be used to gather acoustic information from the ocean environment and provide it to the deployment vessel 10, the deployment vessel 10, moving in a forward direction (toward the right as shown in the drawing) deploys the respective towed array 13A or 13B (along with its associated rear drogue 14A or 14B), telemetry subsystem 12A or 12B and communications cable 11A and 11B, in that order, generally at a speed that corresponds with the speed of its (that is, the deployment vessel's) forward motion. The rear drogue 14A or 14B of the deployed towed array 13A or 13B resists forward motion, and so the towed array 13A or 13B will remain generally stationary as the deployment vessel 10 moves forward during the session. Since the towed array 13 is not pulled through the ocean environment during the session, noise which would otherwise be generated thereby will during deployment will be reduced.

When the particular towed array 13A or 13B, and its associated telemetry subsystem 12A, 12B and communications cable 11A, 11B has been completely deployed, the deployment vessel 10 can begin retrieving the deployed towed array 13A or 13B, and begin deploying the other towed array 13B or 13A. These operations may be repeated through a number of iterations, with the deployment vessel 10 in successive iterations deploying alternate ones of the towed arrays 13A and 13B, so that at least one of the towed arrays 13A or 13B will continually be deployed during the acoustic information gathering session.

The deployment vessel 10 generally has a torpedo-shaped (or submarine) hull, including a blunt forward nose 20, a side wall 21, and a tapering rear portion 22, from which may extend one or more stabilizing fins generally identified by reference numeral 23. A propeller 24, which is driven by an motor (not shown) interior of the hull. Also interior of the hull is a storage compartment 25 for the towed array 13 and communications cable 11 may be provided. Exterior of the hull are situated two deployment pods 26A, 26B, spaced apart from the hull by respective supports 27A and 27B, which include deployment machinery (not shown) for deploying the respective towed array 13A, 13B, and communications cable 11A, 11B. The deployment machinery which is used for deploying the towed array and communications cable is conventional in the art and will not be described herein. The deployment machinery will deploy the towed array and communications cable at substantially the same rate as the forward speed of the deployment vessel 10 during an acoustic information gathering session. It will be appreciated that each deployment pod 26A, 26B may be provided with a storage compartment (not shown) for its respective towed array 13A, 13B, and communications cable 11A, 11B, in which case no storage compartment 25 need be provided.

Each communications cable 11A, 11B may be any conventional cable used for communications in an ocean environment, including one or more media capable of transferring electrical or optic signals, surrounded by suitable insulating material.

Each towed array 13A, 13B comprises a plurality of hydrophones, generally identified by reference numeral 30A, 30B, which are connected to the respective telemetry subsystem 12A, 12B by a communications cable 31A, 31B. The communications cable 31A, 31B used in the towed array may be similar to the communications cable 11A, 11B, including one or more media capable of transferring electrical or optical signals, surrounded by a suitable insulating material. One or more of the signal transfer media may be provided for each of the hydrophones, or all of the hydrophones may transmit acoustic information signals over the same signal transfer medium, in, for example, a time multiplexed manner, using different carrier frequencies, or the like. During an acoustic information gathering session, the telemetry subsystem 12A, 12B will receive the signals from the respective hydrophones 30A, 30B and couple them onto the respective communications cable 11A, 11B for transmission to the deployment vessel 10. It will be appreciated that, if the communications cable 31A, 31B of the respective towed array 13A, 13B has the same structure as the communications cable 11A, 11B, no telemetry subsystem 12A, 12B need be provided.

In operation, during an acoustic information gathering session, the deployment vessel 10 will be propelled in a forward direction (to the right as shown in the drawing) by its propeller 24. During such forward motion, the deployment pod 26A will, during one iteration, deploy the rear drogue 14A, followed by the towed array 13A, the telemetry subsystem 12A (if present) and communications cable 11A, with the deployment being at approximately the same rate rearwardly as the forward motion of the deployment vessel 10. The rear drogue 14A will resist forward motion of the towed array 13A, thereby maintaining the towed array 13A in approximately the same position throughout the acoustic information gathering session, at least until the communications cable 11A is completely deployed. During the iteration, the hydrophones 30A of the towed array can detect acoustic information signals and provide them to the deploying vessel 10 over the communications cables 31A and 11A for study.

At some point during deployment of the communications cable 11A, the deployment vessel, in particular deployment pod 26B, will begin deploying the deploy the rear drogue 14B, followed by the towed array 13B, the telemetry subsystem 12B (if present) and communications cable 11B, with the deployment being at approximately the same rate rearwardly as the forward motion of the deployment vessel 10. The rear drogue 14B will also resist forward motion of the towed array 13B, thereby maintaining the towed array 13B in approximately the same position throughout the iteration, until the communications cable 11B is completely deployed. During the iteration, the hydrophones 30B of the towed array 13B can detect acoustic information signals and provide them to the deploying vessel 10 over the communications cables 31B and 11B for study.

These operations can be repeated through a series of iterations, with the towed arrays 13A, 13B being alternatingly used in successive iterations.

The invention provides a number of advantages. In particular, it provides a dual zero velocity towed array system 5 for gathering acoustic information, that substantially reduces the amount of noise that would otherwise be generated in the acoustic information if the towed array were pulled by the deployment vessel. Since the noise is reduced, the acoustic information can be better detected and processed.

Additionally, as the dual zero velocity towed array system 5 and communications cable 11 remain stationary relative to the water, zero additional drag load is placed on the deployment vessel. Elimination of drag allows more options in array geometry. In particular higher gain arrays may be practical in applications where drag loads would have previously prevented their use.

A number of modifications may be made to the dual zero velocity towed array system 5 as depicted in the drawing. For example, the hydrophones 30A, 30B can be a standard piezoelectric, machined, fiber optic or other device for sensing changes in acoustic pressure, and may be lumped (that is, at specific locations along the towed array 13A, 13B) or distributed along the respective towed array 13A, 13B. In addition, as indicated above, the communications cables 11A, 11B, and 31A, 31B may comprise any medium or media for transferring electrical or optical signals, and preferably should be small in diameter.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A dual zero velocity towed array system for use in an ocean environment comprising:

a plurality of towed array subsystems, each comprising a rear drogue, an elongated communication cable having mounted thereon at least one acoustic sensor; and a deployment vessel for deploying the towed array subsystem, the deployment vessel moving in a forward direction through said ocean environment at a selected forward motion rate and alternatingly deploying the at least one acoustic sensor and communication cable of alternate ones of the towed array subsystems during successive iterations, in each iteration the deployment vessel deploying one of said towed array subsystems rearwardly at a deployment rate corresponding to the forward motion rate, thereby to maintain the at least one acoustic sensor and communication cable in a stable position in the ocean environment, and retracting the other of said towed array subsystems.

2. A towed array system as defined in claim 1 in which the at least one acoustic sensor of each said towed array subsystem comprises a hydrophone.

3. A towed array system as defined in claim 1 in which each said towed array subsystems comprises a plurality of acoustic sensors along said respective communication cable.

4. A towed array system as defined in claim 3 in which at least some of said acoustic sensors comprise hydrophones.

5. A towed array system as defined in claim 1 in which the at least one acoustic sensor generates electrical signals, and each said communication cable conducts said electrical signals generated by said at least one acoustic sensor to said deployment vessel.

6. A towed array system as defined in claim 1 in which the at least one acoustic sensor of each said towed array subsystems generates optical signals, and each said communication cable conducts said optical signals generated by said at least one acoustic sensor to said deployment vessel.

7. A towed array system as defined in claim 1 in which each said towed array subsystem further comprises a telemetry subsystem connected to said communication cable for receiving acoustic information from said at least one acoustic sensor and coupling said acoustic information to said deployment vessel.

* * * * *